(12) United States Patent
Kawakami

(10) Patent No.: US 8,770,059 B2
(45) Date of Patent: *Jul. 8, 2014

(54) BICYCLE SHIFT DEVICE HAVING A LINEARLY SLIDING SHIFT LEVER OPERATED BY A PIVOTING INTERFACE MEMBER

(71) Applicant: Shimano, Inc., Sakai (JP)

(72) Inventor: Tatsuya Kawakami, Sakai (JP)

(73) Assignee: Shimano, Inc., Sakai (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/936,917

(22) Filed: Jul. 8, 2013

(65) Prior Publication Data

US 2013/0291674 A1 Nov. 7, 2013

Related U.S. Application Data

(62) Division of application No. 10/711,702, filed on Sep. 30, 2004, now Pat. No. 8,549,954.

(51) Int. Cl.
*F16C 1/10* (2006.01)
*F16H 59/02* (2006.01)
*B62M 25/04* (2006.01)
*B62K 23/06* (2006.01)

(52) U.S. Cl.
CPC ........... *F16H 59/0278* (2013.01); *B62M 25/04* (2013.01); *B62K 23/06* (2013.01)
USPC ................................ 74/502.2; 74/502; 74/489

(58) Field of Classification Search
CPC ............................. B62K 23/06; F16H 59/0278
USPC ............................. 74/502, 501.6, 489, 473.3
See application file for complete search history.

(56) References Cited

U.S. PATENT DOCUMENTS 5,012,692 A 5/1991 Nagano
5,044,213 A 9/1991 Nagano
(Continued)

FOREIGN PATENT DOCUMENTS

EP 0853035 A2 7/1998
EP 1134158 A2 9/2001
EP 1327576 A2 7/2003

OTHER PUBLICATIONS

Webster's II New Riverside University Dictionary, 1994, pp. 619 and 852. Reference cited by the examiner during prosecution of the parent application.

(Continued)

*Primary Examiner* — Vinh Luong
(74) *Attorney, Agent, or Firm* — James A. Deland

(57) ABSTRACT

A bicycle shift control device comprises a control body supported by a mounting member, wherein the mounting member defines a handlebar mounting axis (HB); a movable operating body; a transmission that converts movement of the operating body into rotation of the control body; and an interface member movably mounted relative to the operating body. The interface member pivots around a pivot axis (P) for moving the operating body, wherein the pivot axis (P) is inclined relative to the handlebar mounting axis (HB). The interface member comprises a lever including an operating force receiving member and an operating force applying member extending from the operating force receiving member. The operating force receiving member extends from the pivot axis (P), and free ends of the operating force receiving member and the operating force applying member are spaced apart from each other.

15 Claims, 8 Drawing Sheets

(56) References Cited

U.S. PATENT DOCUMENTS

| | | |
|---|---|---|
| 5,203,213 A | 4/1993 | Nagano |
| 5,241,878 A | 9/1993 | Nagano |
| 5,400,675 A | 3/1995 | Nagano |
| 5,609,064 A | 3/1997 | Abe |
| 5,617,761 A | 4/1997 | Kawakami |
| 5,701,786 A | 12/1997 | Kawakami |
| 5,730,030 A | 3/1998 | Masui |
| 5,755,139 A | 5/1998 | Kojima |
| 5,921,138 A | 7/1999 | Kojima et al. |
| 6,095,010 A | 8/2000 | Arbeiter et al. |
| 6,155,132 A | 12/2000 | Yamane |
| 6,450,060 B1 | 9/2002 | Shahana |
| 6,502,477 B1 | 1/2003 | Assel |
| 6,564,671 B2 | 5/2003 | Ose |
| 6,694,840 B2 | 2/2004 | Kawakami |
| 6,848,335 B1 | 2/2005 | Kawakami |
| 7,146,874 B2 | 12/2006 | Shahana et al. |
| 2002/0020246 A1 | 2/2002 | Campagnolo |
| 2003/0094064 A1 | 5/2003 | Dal Pra' |
| 2003/0126940 A1 | 7/2003 | Kawakami |
| 2004/0144193 A1 | 7/2004 | Sato et al. |
| 2005/0204854 A1 | 9/2005 | McLaughlin et al. |
| 2009/0165591 A1 * | 7/2009 | Kawakami .................. 74/502.2 |

OTHER PUBLICATIONS

European Search Report for EP 05290709.4, the European application that corresponds to the parent of this application, dated May 26, 2006.

* cited by examiner

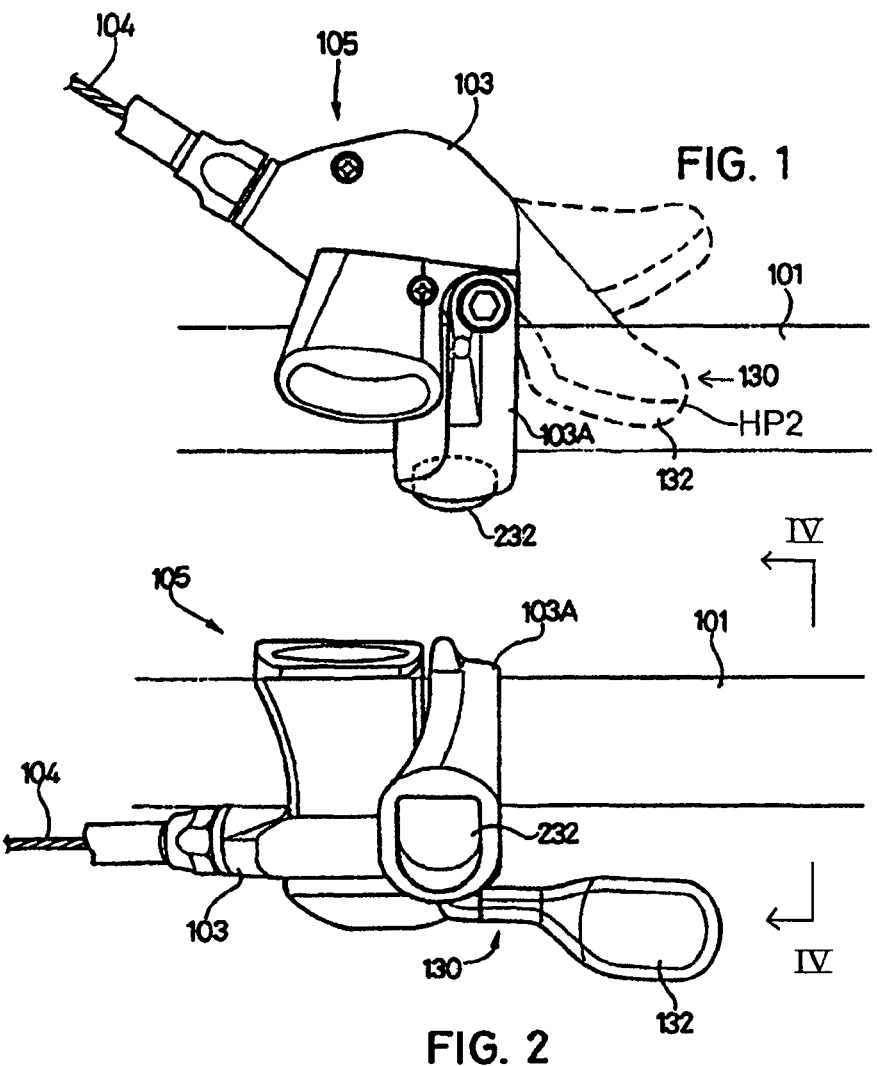

BICYCLE SHIFT DEVICE HAVING A LINEARLY SLIDING SHIFT LEVER OPERATED BY A PIVOTING INTERFACE MEMBER

CROSS REFERENCE TO RELATED APPLICATIONS

This application is a division of U.S. patent application Ser. No. 10/711,702 filed Sep. 30, 2004 and titled "Bicycle Shift Device Having a Linearly Sliding Shift Lever Operated by a Pivoting Interface Member."

BACKGROUND OF THE INVENTION

The present invention is directed to a bicycle shift control device which operates a shifting mechanism via a shift control cable, and specifically concerns a device in which a take-up body that takes up the shift control cable is caused to rotate in the take-up direction by means of a first shift lever which freely returns to a home position, and is caused to rotate in the pay-out direction by means of a second shift lever which freely returns to a separate home position.

A bicycle shift control device of the type noted above for operating a shifting mechanism via a shift control cable is disclosed in U.S. Pat. No. 5,921,138. The shift control device includes a control body for mounting to a bicycle in close proximity to a handlebar for controlling a pulling and releasing of the shift control cable. A first lever is mounted to the control body for movement which causes the control body to effect pulling of the shift control cable, and a second lever is mounted to the control body for movement which causes the control body to effect releasing of the shift control cable. One lever is pivotally coupled to the control body, and the other lever is coupled for linear movement relative to the control body. The lever structured for linear movement is coupled to a transmission mechanism for operating the control body in such a way that very little linear movement is needed to operate the control body. The transmission mechanism includes a plurality of ratchet teeth disposed in a common plane, wherein the path of movement of the linear operating body is parallel to the plane of the ratchet teeth.

Since the linearly moving lever moves in a direction perpendicular to the handlebar, for optimum operation the rider must position his or her thumb directly in front of the linearly operating lever and press the lever in the direction perpendicular to the handlebar. However, during competitive riding the rider usually does not want to worry about having to precisely position the thumb to operate the shifting device. Thus, it is desirable to have a shift control device of the kind noted above wherein the rider does not have to precisely position the thumb in front of the linearly operating lever for optimum operation.

SUMMARY OF THE INVENTION

The present invention is directed to various features of a bicycle shift control device. In one embodiment, a bicycle shift control device comprises a control body supported by a mounting member, wherein the mounting member defines a handlebar mounting axis (HB); a movable operating body; a transmission that converts movement of the operating body into rotation of the control body; and an interface member movably mounted relative to the operating body. The interface member pivots around a pivot axis (P) for moving the operating body, wherein the pivot axis (P) is inclined relative to the handlebar mounting axis (HB). The interface member comprises a lever including an operating force receiving member and an operating force applying member extending from the operating force receiving member. The operating force receiving member extends from the pivot axis (P), and free ends of the operating force receiving member and the operating force applying member are spaced apart from each other.

Additional inventive features will become apparent from the description below, and such features alone or in combination with the above features may form the basis of further inventions as recited in the claims and their equivalents.

BRIEF DESCRIPTION OF THE DRAWINGS

FIG. 1 is a top view of a particular embodiment of a shift control device according to the present invention attached to a handlebar;

FIG. 2 is a front view of the shift control device;

DETAILED DESCRIPTION OF THE EMBODIMENTS

Figure 3:
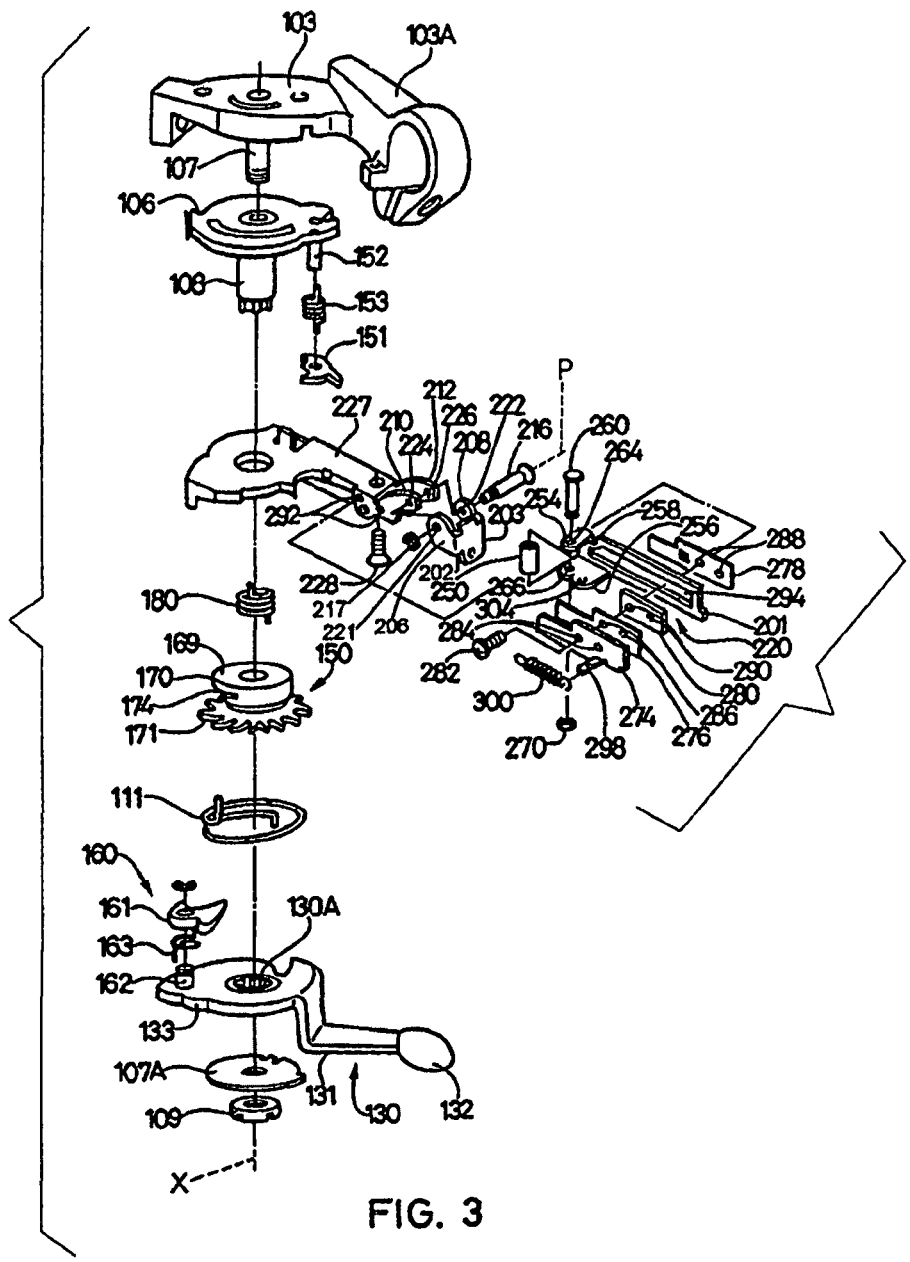
FIG. 3 is an exploded view of the shift control device.

FIGS. 1-7 are various views of a particular embodiment of a shift control device 105 according to the present invention. As shown in those Figures, shift control device 105 is constructed for pulling and releasing a shift control cable 104, and it includes a mounting bracket 103 with an annular mounting sleeve 103A defining a handlebar mounting axis (HB), wherein mounting sleeve 103A fits around a handlebar 101 to fasten bracket 103 to handlebar 101 in a known manner. An arm-shaped linearly sliding first operating body 220 (FIGS. 4-7) of shift control device 105 is slidingly mounted to an intermediate bracket 227 attached to mounting bracket 103 through a screw 228. Sliding operating body 220 is located below handlebar 101 and terminates at an end 201 forming an abutment. An interface member in the form of an operating tab 202 with an operating force receiving surface 203, an operating force applying surface 204 and parallel spaced mounting ears 206 and 208 is pivotably coupled to corresponding parallel spaced mounting ears 210 and 212 on intermediate bracket 227 through a pivot shaft 216 and a C-clip 217, wherein pivot shaft 216 extends through openings 221, 222, 224 and 226 in mounting ears 206, 208, 210 and 212, respectively so that operating tab 202 pivots around a pivot axis (P). A decorative cap 232 (FIGS. 1 and 2) having the same general structure as operating tab 202 also may be pivotably mounted to mounting ears 210 and 212 on intermediate bracket 227 or may be otherwise placed over operating tab 202 in order to vary the shape or inclination of the surface that is operated by the thumb.

A pivoting second operating body 130 of the shift control device 105 also extends below the handlebar 101. A finger contacting part 132 of operating body 130, in the form of a button, is disposed beneath and to the right of operating tab 202. As a result, operation of both operating bodies is possible with the thumb of the hand gripping the handlebar 101.

As is shown in FIG. 3, shift control device 105 includes a pawl support plate 106 with a supporting shaft 108 and a pivot pin 152, all of which are rigidly fastened to bracket 103 by means of an attachment bolt 107, a washer 107a and a nut 109. A control body in the form of a take-up body 170 is mounted around supporting shaft 108 for rotation around a rotational axis (X). A first ratchet mechanism 150, used as a first transmission, transmits the displacement of sliding operating body 220 to the take-up body 170 to cause the rotation of the take-up body 170 in one direction, and a second ratchet mechanism 160, used as a second transmission, transmits the displacement of pivoting operating body 130 to the take-up body 170 to cause the rotation of the take-up body 170 in the other direction. In this embodiment, displacement of pivoting operating body 130 causes the take-up body 170 to pull on cable 104, and displacement of sliding operating body 220 causes the. take-up body 170 to release cable 104.

Figure 4:
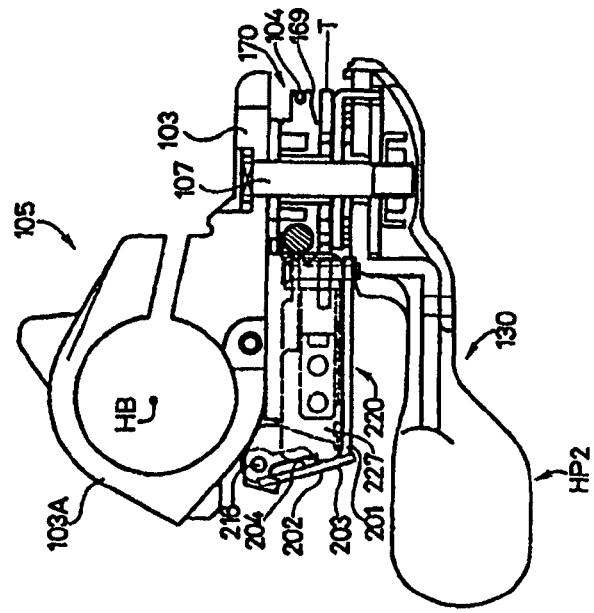
FIG. 4 is a cross sectional view of the shift control device, taken along line IV-IV in FIG. 2, in an inoperative state.
Figure 5:
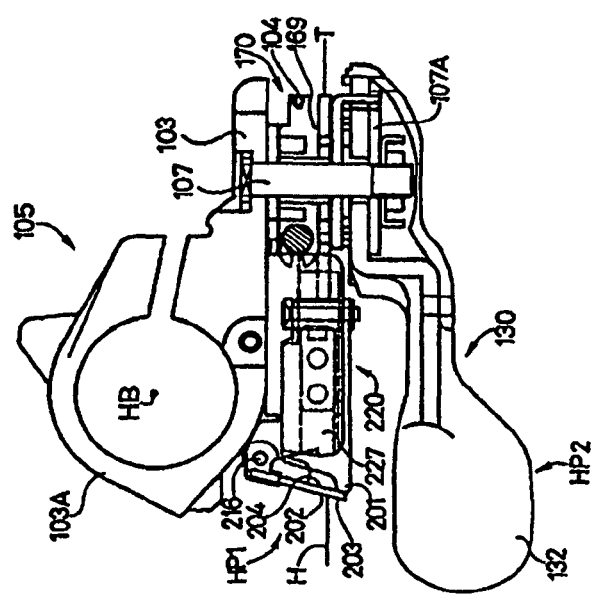
FIG. 5 is a cross sectional view of the shift control device showing the linearly operating body in an operating position.
Figure 6:
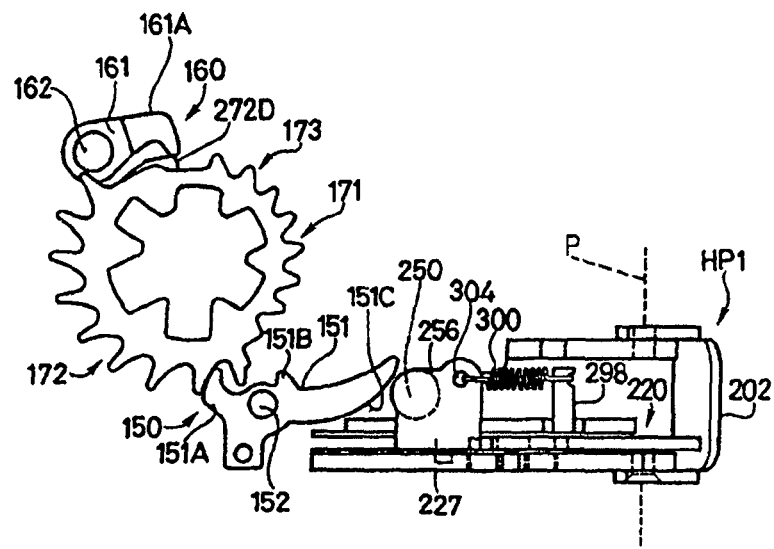
FIG. 6 is a detailed bottom view of the linearly operating body in a home position.
Figure 7:
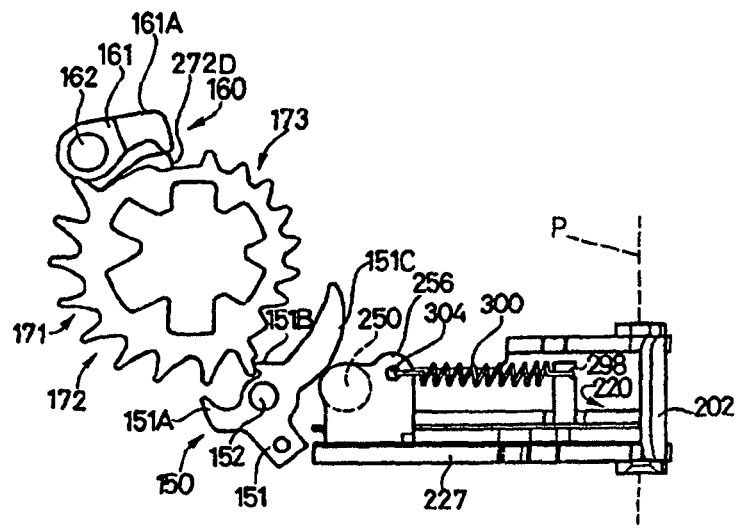
FIG. 7 is a detailed bottom view of the linearly operating body in an operating position.

The take-up body 170 is equipped with a drum part 169 which is constructed so that the shift control cable 104 from a shifting mechanism (not shown) on the front or rear of the bicycle is taken up along a wire groove 174. By rotating in the forward direction or reverse direction with respect to the supporting shaft 108, the take-up body 170 takes up or pays out the shift control cable 104. Take-up body 170 is coupled to a drive plate 171 for integral rotation therewith. As shown in FIGS. 6 and 7, drive plate 171 includes a plurality of drive teeth 173 and a plurality of position retaining teeth 172, all of which are disposed in a common plane (T), as illustrated in FIGS. 4 and 5.

Sliding operating body 220 includes a pawl pushing roller 250 rotatably mounted between roller support ears 254 and 256 disposed at a pawl operating end 258 of sliding operating body 220 through a pivot shaft 260 and a C-clip 270, wherein pivot shaft 260 extends through openings 264 and 266 in mounting ears 254 and 256, respectively. Sliding operating body 220 is slidingly mounted to intermediate bracket 227 between a release plate 274, slide shims 276 and 278, and a release plate bushing 280, all of which are mounted to intermediate bracket 227 through bolts 282 (only one such bolt is shown in FIG. 3) that extend through openings 284, 286, 288 and 290 in release plate 274, slide shims 276 and 278 and release plate bushing 280, respectively, and through two pairs of opposed openings 292 (only two such openings are shown in FIG. 3) in intermediate bracket 227. Sliding operating body 220 also includes an elongated opening 294 for accommodating bolts 282 so that bolts 282 do not interfere with the sliding operation of sliding operating body 220.

Release plate 274 includes a spring coupling abutment 298. One end of a return spring 300 is attached to spring coupling abutment 298, and the other end of return spring 300 is attached to mounting ear 256 in sliding operating body 220 through an opening 304. Return spring 300 biases sliding operating body 220 toward a home position (HP1) shown in FIGS. 4 and 6.

The first ratchet mechanism 150 comprises a first pawl 151 that is rotatably attached to pivot pin 152 extending from pawl support plate 106, the plurality of position retaining teeth 172 which are formed on the outer circumferential surface of the drive plate 171, and a spring 153 which drives the first pawl 151 clockwise (in FIGS. 6 and 7) in the direction of engagement with position retaining teeth 172. First pawl 151 includes pawl tips 151A and 151B for engaging position retaining teeth 172 and a pawl operating part 151C for engaging pawl pushing roller 250 on sliding operating member 220. The operation of first ratchet mechanism 150 is the same as in the shift control device disclosed in U.S. Pat. No. 5,921,138, incorporated herein by reference, so a detailed description of its operation shall be omitted. The path of motion of sliding operating body 220 is substantially parallel to the ratchet teeth plane (T).

The pivoting operating body 130 is equipped with a second arm part 131, the second finger contact part 132 which is formed on the tip of the second arm part 131 in order to allow finger operation, and a pawl supporting part 133. A spring 111 is connected between washer 107A and pawl supporting part 133 for biasing pivoting operating body 130, and hence finger contacting part 132, to a second home position HP2 shown by solid lines in FIG. 1. The path of motion of pivoting operating body 130, from second home position HP2 to a second shift position shown by broken lines in FIG. 1, is substantially parallel to the ratchet teeth plane (T).

The second ratchet mechanism 160 comprises a second pawl 161 that is rotatably attached to a pivot pin 162 extending from pawl supporting part 133, the plurality of drive teeth 173 formed on the outer circumferential surface of the drive plate 171, and a spring 163 which biases the second pawl 161 clockwise (in FIGS. 6 and 7) in the direction of engagement with drive teeth 173. When pivoting operating body 130 is in the home position (HP2) shown in FIGS. 4 and 5, a tip 161A of pawl 161 rests on a ledge 272D of intermediate bracket 227, thus uncoupling pawl 161 from drive plate 172. The operation of second ratchet mechanism 160 also is the same as the shift control device disclosed in U.S. Pat. No. 5,921,138, so a detailed description of its operation shall be omitted.

Because sliding operating body 220 operates pawl 151 by pressing pawl pressing roller 250 against pawl operating part 151C when sliding operating body 220 moves from the first home position HP1 shown in FIG. 6 to a first shift position shown in FIG. 7, very little movement (e.g., 9 millimeters) is required to operate pawl 151. Operating force receiving surface 203 of operating tab 202 is inclined relative to a horizontal axis (H) which, in this embodiment, is parallel to ratchet teeth plane (T). Thus, operating tab 202 will pivot counterclockwise as shown in FIGS. 4 and 5 even if the rider's thumb applies a vertically downward force. As a result of the small movement required to operate pawl 151 and the inclined nature of operating tab 202, operating tab 202 may operate sliding operating body 220 without requiring the rider to press perpendicular to the handlebar and without precision placement of the rider's thumb. Indeed, even a downward sliding motion of the thumb could operate sliding operating body 220 across the front face of shift control device 105.

While the above is a description of various embodiments of the present invention, further modifications may be employed without departing from the spirit and scope of the present invention. For example, operating body 220 may cause take-up body 170 to rotate in the cable pay out direction, and operating body 130 may cause take-up body 170 to rotate in the cable take-up direction. If desired, operating body 220 may be constructed for pivoting displacement, and operating body 130 may be constructed for sliding displacement with the operating tab 202 described above. Both operating bodies 220 and 130 may be sliding operating bodies, each with their own operating tab. While the path of movement of sliding operating body 220 in the above embodiment is substantially parallel to the plane of the ratchet teeth (T), the path may vary, for example, by plus or minus thirty degrees.

Figure 8:
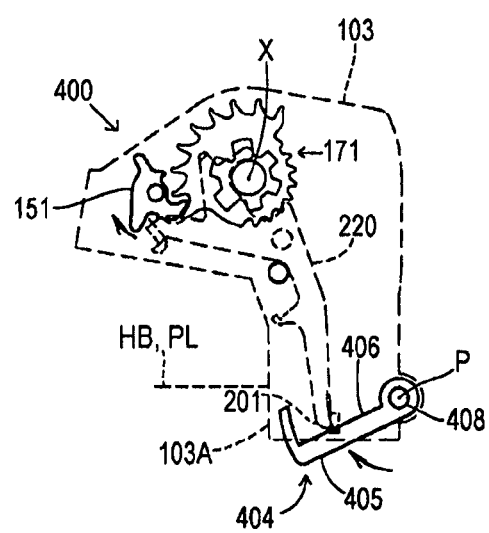
FIGS. 8-11 are top views of relevant components of alternative embodiments of the shift control device.

While operating tab 202 pivoted around a pivot axis (P) that was substantially parallel to the handlebar axis (HB) in the above embodiments, the pivot axis (P) could be inclined relative to the handlebar axis (HB) by any degree to accommodate different riding styles. The configuration of operating tab 202 also could be changed accordingly. For example, FIG. 8 is a top view of relevant components of an alternative embodiment shift control device 400 wherein an interface member in the form of an operating member 404 with an operating force receiving surface 405 and an operating force applying surface 406 is connected to the right side of intermediate bracket 227 through a pivot shaft 408 so that operating member 404 pivots around a pivot axis (P) that is substantially perpendicular to handlebar axis (HB) and is substantially parallel to rotational axis (X). Also, operating member 404 moves in a direction toward a plane (PL) that contains the handlebar mounting axis (HB) and is parallel with the rotational axis (X) when sliding operating body 220 moves from the home position toward the shift position. In this case, the cyclist may operate sliding operating body 220 by a leftward and/or forward sliding motion of the thumb or finger, thereby pressing operating member 404 toward handlebar axis (HB).

Figure 9:
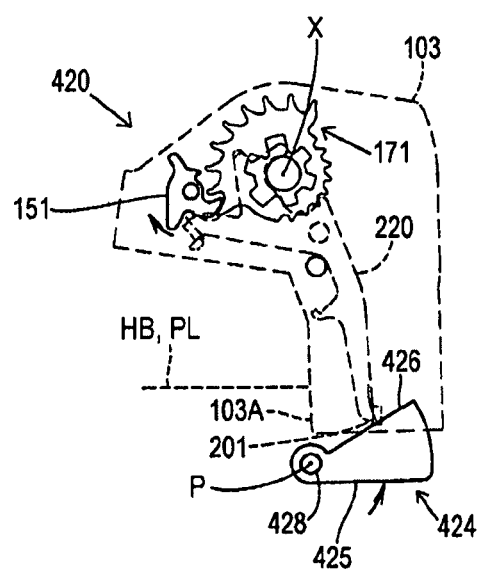

FIG. 9 is a top view of relevant components of another alternative embodiment shift control device 420 wherein an interface member in the form of a fan-shaped operating member 424 with an operating force receiving surface 425 and an operating force applying surface 426 is connected to the left side of intermediate bracket 227 through a pivot shaft 428 so that operating member 424 pivots around a pivot axis (P) that is substantially perpendicular to handlebar axis (HB) and is substantially parallel to rotational axis (X). Operating member 424 also moves in a direction toward plane (PL) when sliding operating body 220 moves from the home position toward the shift position. In this case, the cyclist may operate sliding operating body 220 by a rightward and/or forward sliding motion of the thumb or finger, thereby pressing operating member 424 toward handlebar axis (HB).

Figure 10:
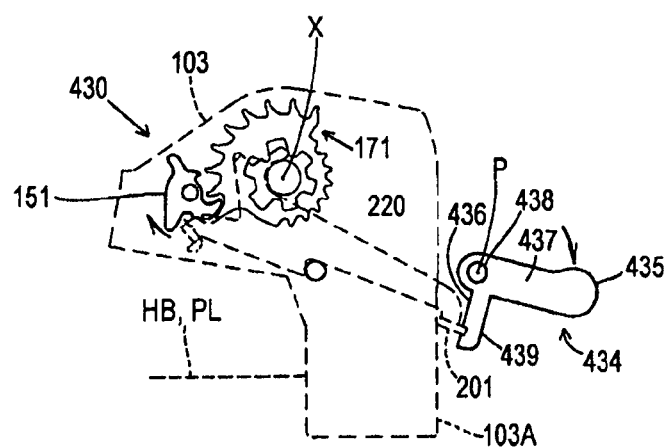

FIG. 10 is a top view of relevant components of another alternative embodiment shift control device 430 wherein an interface member in the form of a lever-shaped operating member 434 with an operating force receiving surface 435 and an operating force applying surface 436 is connected to the right side of intermediate bracket 227 through a pivot shaft 438 so that operating member 434 pivots around a pivot axis (P) that is substantially perpendicular to handlebar axis (HB) and is substantially parallel to rotational axis (X). Operating member 434 also moves in a direction toward plane (PL) when sliding operating body 220 moves from the home position toward the shift position. In this embodiment, operating member 434 is an L-shaped member having an operating force receiving member 437 extending from pivot shaft 438 and an operating force applying member 439 extending from pivot shaft 438 substantially perpendicular to operating force receiving member 437 such that pivot shaft 438 is located at the junction of operating force receiving member 437 and operating force applying member 439, and operating force applying surface 436 is disposed in front of handlebar axis (HB). Thus, the cyclist may operate sliding operating body 220 by a rearward and/or lateral sliding motion of the thumb or finger, thereby pressing operating force receiving member 437 toward handlebar axis (HB).

Figure 11:
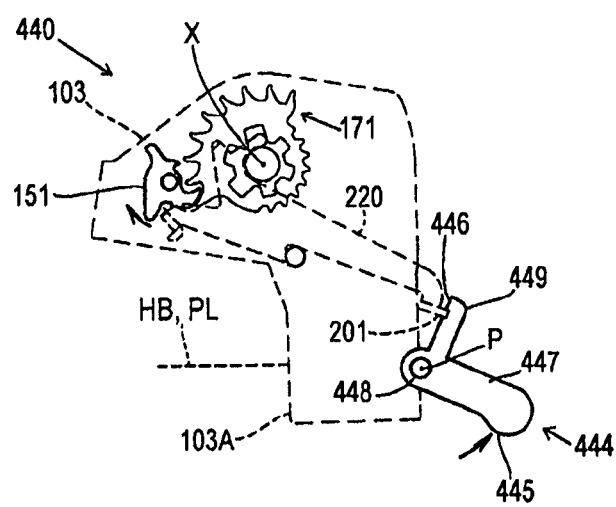

FIG. 11 is a top view of relevant components of another alternative embodiment shift control device 440 wherein an interface member in the form of a lever-shaped operating member 444 with an operating force receiving surface 445 and an operating force applying surface 446 is connected to the right side of intermediate bracket 227 through a pivot shaft 448 so that operating member 444 pivots around a pivot axis (P) that is substantially perpendicular to handlebar axis (HB) and is substantially parallel to rotational axis (X). Operating member 444 also moves in a direction toward plane (PL) when sliding operating body 220 moves from the home position toward the shift position. In this embodiment as well, operating member 444 is an L-shaped member having an operating force receiving member 447 extending from pivot shaft 448 and an operating force applying member 449 extending from pivot shaft 448 substantially perpendicular to operating force receiving member 447 such that pivot shaft 448 is located at the junction of operating force receiving member 447 and operating force applying member 449, and operating force applying surface 446 is disposed behind handlebar axis (HB). Thus, the cyclist may operate sliding operating body 220 by a forward and/or lateral sliding motion of the thumb or finger, thereby pressing operating force receiving member 447 toward handlebar axis (HB).

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

What is claimed is:

1. A bicycle shift control device which operates a shifting mechanism via a shift control cable, the shift control device comprising:
   a mounting member structured to mount the shift control device to a handlebar, wherein the mounting member defines a handlebar mounting axis (HB);
   a control body supported by the mounting member and rotatable about a rotational axis (X) for controlling the shift control cable;
   a first operating body having an abutment in a position spaced apart from the control body and which is coupled to the shift control device for movement between a first home position and a first shift position;
   a first transmission that converts movement of the first operating body from the first home position to the first shift position into rotation of the control body, wherein the first transmission includes a plurality of ratchet teeth;
   an interface member movably mounted relative to the first operating body and having an operating force receiving surface and an operating force applying surface, wherein the operating force receiving surface is adapted to receive an operating force from a rider;
   wherein the interface member pivots around a pivot axis (P) so that the operating force applying surface applies the operating force to the abutment of the first operating body for moving the first operating body from the first home position to the first shift position;
   wherein the pivot axis (P) is inclined relative to the handlebar mounting axis (HB);
   wherein the interface member moves in a direction toward a plane (PL) that contains the handlebar mounting axis (HB) and is parallel with the rotational axis (X) when the first operating body moves from the first home position toward the first shift position; and
   wherein the interface member comprises a lever including:
      an operating force receiving member extending from the pivot axis (P); and an operating force applying member extending from the operating force receiving member;

wherein free ends of the operating force receiving member and the operating force applying member are spaced apart from each other.

2. The device according to claim 1 wherein the plurality of ratchet teeth are disposed in a ratchet teeth plane (T), and wherein the ratchet teeth plane (T) is parallel to a horizontal axis (H).

3. The device according to claim 1 wherein the plurality of ratchet teeth are disposed in a ratchet teeth plane (T), and wherein a path of movement of the first operating body is substantially parallel to the ratchet teeth plane (T).

4. The device according to claim 1 wherein the pivot axis (P) is disposed at a junction between the operating force receiving member and the operating force applying member.

5. The device according to claim 1 wherein the first operating body moves linearly between the first home position and the first shift position.

6. The device according to claim 5 wherein the first operating body moves in a straight line between the first home position and the first shift position.

7. The device according to claim 1 further comprising:
   a second operating body coupled to the shift control device for movement between a second home position and a second shift position; and
   a second transmission that converts the movement of the second operating body from the second home position to the second shift position into a rotation of the control body.

8. The device according to claim 7 wherein the second operating body rotates between the second home position and the second shift position.

9. The device according to claim 8 wherein the second operating body forms a finger contact part in a position spaced apart from the control body.

10. The device according to claim 9 wherein the second operating body rotates around the rotational axis (X).

11. The device according to claim 10 wherein the first operating body moves in a straight line between the first home position and the first shift position.

12. The device according to claim 1 wherein the pivot axis (P) extends through an end portion of at least one of the operating force receiving member or the operating force applying member.

13. The device according to claim 12 wherein the operating force receiving member extends away from the pivot axis (P), and wherein the operating force applying member extends away from the operating force receiving member and away from the pivot axis (P).

14. The device according to claim 13 wherein the pivot axis (P) is disposed at a junction between the operating force receiving member and the operating force applying member.

15. The device according to claim 13 wherein the operating force receiving surface is inclined relative to the operating force applying surface.

* * * * *